J. W. CALHOUN.
VALVE.
APPLICATION FILED AUG. 21, 1912.
1,061,044.
Patented May 6, 1913.
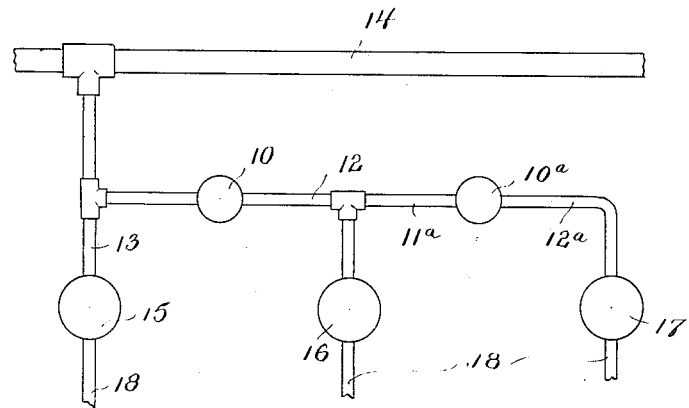
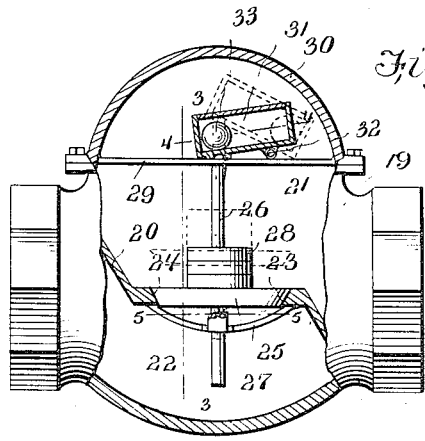
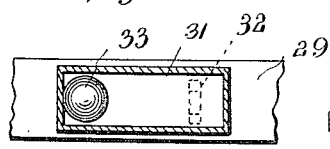
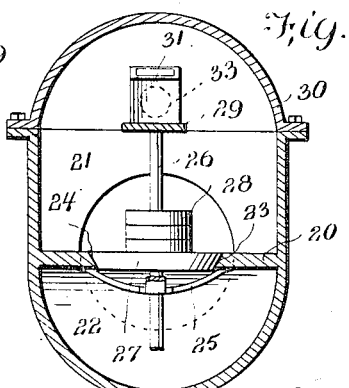
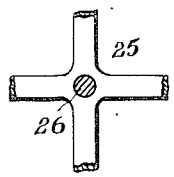
Inventor
J. W. Calhoun.
By Victor J. Evans
Attorney
Witnesses
William Smith
H. H. Hoster

UNITED STATES PATENT OFFICE.

JOHN W. CALHOUN, OF HUNTINGTON, WEST VIRGINIA.

VALVE.

1,061,044.  Specification of Letters Patent.  Patented May 6, 1913.

Application filed August 21, 1912. Serial No. 716,258.

*To all whom it may concern:*

Be it known that I, JOHN W. CALHOUN, a citizen of the United States, residing at Huntington, in the county of Cabell and State of West Virginia, have invented new and useful Improvements in Valves, of which the following is a specification.

The invention relates to valves and has for an object to provide a valve for controlling the flow of a fluid by the pressure thereof.

The invention embodies, among other features, a valve that is particularly adapted for use in connection with water meters and in which, when the pressure of the water flowing into one meter is greater than the pressure rating of the meter, the pressure of the water will actuate the valve to open a second meter and permit the excess water to pass through the second meter and so on, so that an accurate record of the amount of water used will be recorded by the meter.

The invention further embodies a valve of the gravity type and in which a weight normally holds the valve in closed position, the valve being operable to open by the pressure of the fluid pressing against the valve.

In the further disclosure of the invention reference is to be had to the accompanying drawings, constituting a part of this specification, in which similar characters of reference denote corresponding parts in all the views, and in which:

Figure 1 is a diagrammatic view showing the manner in which a plurality of valves are used in connection with a series of meters; Fig. 2 is a vertical sectional view of the device, showing the valve in normal or closed position in full lines and in open position in dotted lines; Fig. 3 is a vertical sectional view taken on the line 3—3 in Fig. 2; Fig. 4 is a longitudinal vertical sectional view, taken on the line 4—4 in Fig. 2; and Fig. 5 is a horizontal sectional view taken on the line 5—5 in Fig. 2.

Referring to the views and more particularly to Fig. 1, use is made of a plurality of valves 10, 10ª having connection with pipes 11, 11ª and 12, 12ª, the pipe 11 being connected to a pipe 13 connecting a main supply pipe 14 with a meter 15, the pipe 12 having connection with a meter 16 and with the pipe 11ª, the mentioned pipe 11ª being connected to the valve 10ª as mentioned, with the pipe 12ª connected to the valve 10ª and a meter 17, the mentioned meters 15, 16 and 17 being provided with the usual outlet pipes 18. The valves 10, 10ª each consist of a casing 19 provided with a partition 20 forming compartments 21, 22 in the casing 19, an opening 23 being formed in the partition 20 and the mentioned partition at this point being slightly dished to form a valve seat 24. A guide plate 25 extends across the opening 23 and mounted to slide on the guide plate is a valve stem 26 having a valve member 27 secured thereon and adapted to normally repose on the valve seat 24, a weight 28 being provided on the valve stem 26 immediately above the valve member 27 as shown. The upper end of the valve stem 26 passes through a horizontally arranged plate 29 to which is secured a semicircular hood 30 with the upper extremity of the valve stem 26 journaled at one end of a hollow body 31 mounted to rock on a knob 32 formed on the upper face of the plate 29, the under side of the body 31 being grooved to receive the knob 32 therein as shown. A ball weight 33 is loosely mounted within the body 31 and by referring to Fig. 2 it will be seen that when the valve member 27 reposes on the valve seat 24, the body 31 will be inclined downwardly toward that end of the body to which the valve stem 26 is connected so that the ball weight 33, rolling down the incline of the body, will lie at the forward end of the body or at that end of the body to which the valve stem is connected in the manner mentioned heretofore.

Now referring to Fig. 1, when the water passing into the meter 15 increases in pressure beyond the capacity of the meter, the increased pressure of the water passing into the pipe 11 will be sufficient to actuate the valve 27, thus unseating the same from the valve seat 24 and against the weight of the valve together with the weights 28, 33 and the weight of the body 31. As the valve member 27 is moved upwardly and unseated from the seat 24, the forward end of the body 31 will be raised, thus causing the ball weight 33 to move rearwardly in the body 31 and assume a position immediately above the knob 32 on which the body 31 is mounted to rock and the valve member 27 being now in open position, the water passing into the compartment 32, will pass through the opening 23 and into the compartment 21 from which it will pass through the pipe 12 into the second meter 16. Now if the pressure of the water should increase to such an extent that the same cannot be accommodated by the second meter 16 as well as the first meter 15, the valve 10ᵃ will be actuated in the same manner as the valve 10 in the manner mentioned herein, and the water will thence pass through the valve 10ᵃ and into the pipe 12ᵃ from which it will pass into the meter 17.

From the foregoing description it will thus be seen that at the moment the pressure of the water for the first meter 15 becomes greater than the capacity of the meter, the mentioned excess pressure of the water will be sufficient to actuate the valve 10, thus permitting the water to pass into the second meter 16. Now if the pressure of the water increases beyond the capacity of the meter 16 the valve 10ᵃ will be actuated so that the water will pass into the meter 17 and in this manner the flow of water can be accurately recorded by the meters 15, 16 and 17, the object being to unload the additional burden placed upon the first meter when the pressure of the water is increased beyond the capacity of the meter so that the mentioned excess water will be taken up and recorded by the second meter and so on by the third meter when the second meter is overburdened beyond its capacity.

Having thus described my invention, I claim:

1. In a valve, the combination with a casing, of a partition therein and forming compartments in the casing, the said partition being provided with an opening connecting the compartments, a valve seat on the partition, a guide plate on the partition adjacent the said valve seat, a valve stem mounted to slide on the said guide plate, a valve on the valve stem and adapted to normally repose on the said valve seat, a weight on the said valve, a plate mounted to close the upper compartment in the casing, a hood on the said plate, the upper end of the said valve stem being arranged to slidably pass through the said plate, a knob on the plate, a hollow body mounted to rock on the said knob and having pivotal connection with the upper end of the valve stem, and a ball weight loosely mounted within the said body.

2. In a valve, the combination with a casing, of a partition therein and provided with an opening connecting compartments formed by the partition, a valve seat on the partition, a valve stem, a valve member on the valve stem and adapted to normally repose on the said valve seat, a plate on the said casing, a knob on the said plate, a hollow body mounted to rock on the said knob and having pivotal connection with the said valve stem, and a ball weight loosely mounted in the said body.

3. In a valve, the combination with a casing, of a partition therein and provided with an opening connecting compartments formed by the partition, a valve seat on the partition, a valve stem, a valve member on the valve stem and adapted to normally repose on the said valve seat, a plate on the said casing, a knob on the said plate, a hollow body mounted to rock on the said knob and having pivotal connection with the said valve stem, a ball weight loosely mounted in the said body, and a guide plate secured to the said partition and having the said valve stem slidably passed therethrough to guide the said valve member into or out of engagement with the said valve seat.

In testimony whereof I affix my signature in presence of two witnesses.

JOHN W. CALHOUN.

Witnesses:
C. A. EFFINGHAM,
M. M. BEVAN.